United States Patent
Dawkins et al.

(10) Patent No.: US 6,865,688 B2
(45) Date of Patent: Mar. 8, 2005

(54) LOGICAL PARTITION MANAGEMENT APPARATUS AND METHOD FOR HANDLING SYSTEM RESET INTERRUPTS

(75) Inventors: George John Dawkins, Austin, TX (US); Van Hoa Lee, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 517 days.

(21) Appl. No.: 09/998,047

(22) Filed: Nov. 29, 2001

(65) Prior Publication Data

US 2003/0101377 A1 May 29, 2003

(51) Int. Cl.$^7$ ................................. G06F 11/00

(52) U.S. Cl. .................. 714/6; 714/5; 714/6

(58) Field of Search .................. 714/5, 6, 8

(56) References Cited

U.S. PATENT DOCUMENTS 6,654,906 B1 * 11/2003 Arndt .......................... 714/11
6,658,591 B1 * 12/2003 Arndt ........................... 714/6
2002/0124194 A1 * 9/2002 Dawkins et al. ............ 713/310

* cited by examiner

*Primary Examiner*—Nadeen Iqbal
*Assistant Examiner*—Timothy M. Bonura
(74) *Attorney, Agent, or Firm*—Duke W. Yee; Mark E. McBurney; James O. Skarsten

(57) ABSTRACT

A logical partition management apparatus and method for handling system reset interrupts (SRIS) are provided. The apparatus and method provide a SRI handler in the hypervisor that is capable of handling SRIs which may occur at any time during the operation of the multiprocessor computing system. The apparatus and method allow a hypervisor call to be completed before an SRI is handled. In this way, the SRI does not cause a processor of the symmetric multiprocessor (SMP) system to indefinitely hold a lock on a system resource and thus, other processors are not starved due to an inability to access the system resource.

21 Claims, 7 Drawing Sheets

LOGICAL PARTITION MANAGEMENT APPARATUS AND METHOD FOR HANDLING SYSTEM RESET INTERRUPTS

BACKGROUND OF THE INVENTION

1. Technical Field

The present invention is directed to an improved data processing system. More specifically, the present invention is directed to a logical partition management apparatus and method for handling system reset interrupts (SRIs).

2. Description of Related Art

Logical partitioning (LPAR) is a system structure which allows a symmetric multiprocessor (SMP) system to be subdivided into "partitions," each of which contains the necessary processor, memory, and input/output (I/O) resources to run an operating system (OS) image. LPAR provides easy redeployment of computing resources to support changing workloads without the need for physical restructuring, flexible growth to accommodate increased workloads, and large, scalable single-system-image enterprise systems.

Because LPAR breaks the traditional model of one operating system running on one hardware platform, LPAR generates the need for a set of platform management functions that operate outside the scope of any single operating system image. This need has been met by the introduction of a set of platform management functions implemented in firmware.

These platform management functions have been implemented in a firmware hypervisor. The hypervisor is a firmware resident application, or set of applications, that manages virtual machines and logical partitions. The hypervisor is responsible for many aspects of partition management including allocating resources to a partition, installing an operating system in a partition, starting and stopping the operating system in a partition, dumping main storage of a partition, communicating between partitions, and other partition management functions.

In logical partitioned computing systems, a partition processor normally makes many hypervisor calls for services. The hypervisor implements many software locks to enforce mutually exclusive accesses for updating hypervisor data structures used to maintain the partition from which the processor belongs, and for using hardware resources shared among all partitions in the system.

During any hypervisor call, an asynchronous hardware system reset interrupt (SRI) may occur. An SRI is similar to a virtual pressing of the "reset" button on a computer. That is, rather than actually pressing the reset button and thereby sending a reset signal to all processors of the entire computing system, a virtual reset button is provided for each partition. In this way, a system reset interrupt may be generated for a partition and thereby, only the partition is reset. Thus, the partition may be rebooted without having to reboot other partitions in the computing system.

If an SRI occurs during a hypervisor call, the SRI will disrupt and end the hypervisor call. Moreover, any software locks obtained by the partition processor executing the hypervisor call will be held indefinitely and become dead locks. That is, even though the partition has received the SRI, the hypervisor data structures will still indicate that the partition processor has a lock on a shared resource if the hypervisor call is prematurely ended. Since the hypervisor call cannot be completed, the lock will never be released. This causes a problem in that other processors in the multiprocessor system will not be able to obtain access to the system resources locked by the partition processor. These other processors will become "starved" by continuing to try to obtain a lock on the system resources, i.e. spinning on the lock, and never being able to perform the necessary work requiring the lock on the system resource. Additionally, if the hypervisor call is prematurely ended while updating important data structures, the integrity of these data structures may jeopardize the normal operation of the hypervisor.

Therefore, it would be beneficial to have a mechanism for avoiding dead locks due to the occurrence of an SRI during a hypervisor call.

SUMMARY OF THE INVENTION

The present invention provides a logical partition management apparatus and method for handling system reset interrupts (SRIs). With the present invention, within each processor, there is a one-bit flag in a hardware specific special purpose register. This flag is referred to as the SRI_delay flag and is used by the system reset interrupt handler of the hypervisor to indicate that a system reset interrupt has occurred. This flag is initialized to 0 by the hardware upon the power-on condition.

When the partition processor receives a system reset interrupt, the SRI handler of the hypervisor is given control. The SRI handler saves the partition processor's registers to a context memory buffer. Next, the SRI handler determines the nature of the reset.

The reset may be either a hard reset or a soft reset. If the reset is a hard reset for terminating the partition, the SRI handler clears the SRI_delay flag and reallocates the processor back to the global processor available pool. In this way, the processor becomes available for reassignment to another partition. Any locks held by the processor which is reallocated to the global processor available pool are released by the hypervisor.

If the reset is a soft reset, the SRI handler determines if the SRI occurred while a hypervisor call was in progress. If the SRI occurred during a hypervisor call, the SRI handler sets the SRI_delay flag and changes the "rfid" instruction, i.e. the instruction used by the interrupt handler to return control back to the interrupted code, in the jmp_table of the hypervisor exit code for the processor into a branch instruction to the special routine, named simulated_SRI( ), in the hypervisor which simulates the delay SRI.

The jmp_table is an array where each processor of the system has an instruction which is the last instruction to be executed by the processor at the end of the hypervisor call. Normally, the instruction is the "rfid" instruction. If the SRI occurs during the hypervisor call, this instruction will be replaced by the SRI handler with a branch instruction to the entry point of the special routine in the hypervisor. This special routine, named simulated_SRI( ) and depicted in FIG. 5, discussed hereafter, will be later executed by the hypervisor call to prepare and simulate the delayed SRI so that the SRI can resume the handling of the original interrupt which has previously been delayed.

In addition, the SRI handler restores the registers context and returns to allow the disrupted hypervisor call to complete. When a program is interrupted, the interrupt handler saves all volatile registers into a memory buffer. Register context refers to the contents of all registers of the processor to be saved in order for the interrupted program to be resumed properly.

If the interrupt did not occur during a hypervisor call and it was a soft interrupt, the interrupt must have been the simulated delay SRI from the hypervisor, or the interrupt occurred within the partition. If the soft reset interrupt is the simulated delay interrupt or occurred within the partition, the SRI handler checks if the SRI_delay flag is set. If the SRI_delay flag is cleared, then the SRI occurred in a partition environment. If the SRI_delay flag is set, then the SRI is a simulated delay SRI of an original SRI which occurred during a hypervisor call. In this case, the SRI handler will clear the SRI_delay flag, and restore the instruction in the jmp_table of the processor back to the original "rfid" instruction. This effectively allows the detection and simulation of delay SRIs in the future.

In any of the above cases, the SRI handler proceeds to send the processor back to the partition's reset entry point for further action. That is, when a SRI occurs, the SRI handler will send the processor back to the partition's operating system reset handler so that the operating system can decide what action to take upon the arrival of the SRI. The operating system may perform its reset function to bring down itself and the partition, or to reboot the operating system of the partition, for example.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a logical partition management apparatus and method for system reset interrupts (SRIs). The present invention is implemented in a multiprocessor computing environment in which resources are shared amongst a plurality of processors. In order to obtain access to shared resources, a processor must obtain a lock on the shared resource which gives the processor exclusive access to the resource until the lock is released. It is the problem associated with locks being obtained and not released due to an SRI occurring during a hypervisor call that is the primary focus of the present invention.

Figure 1:
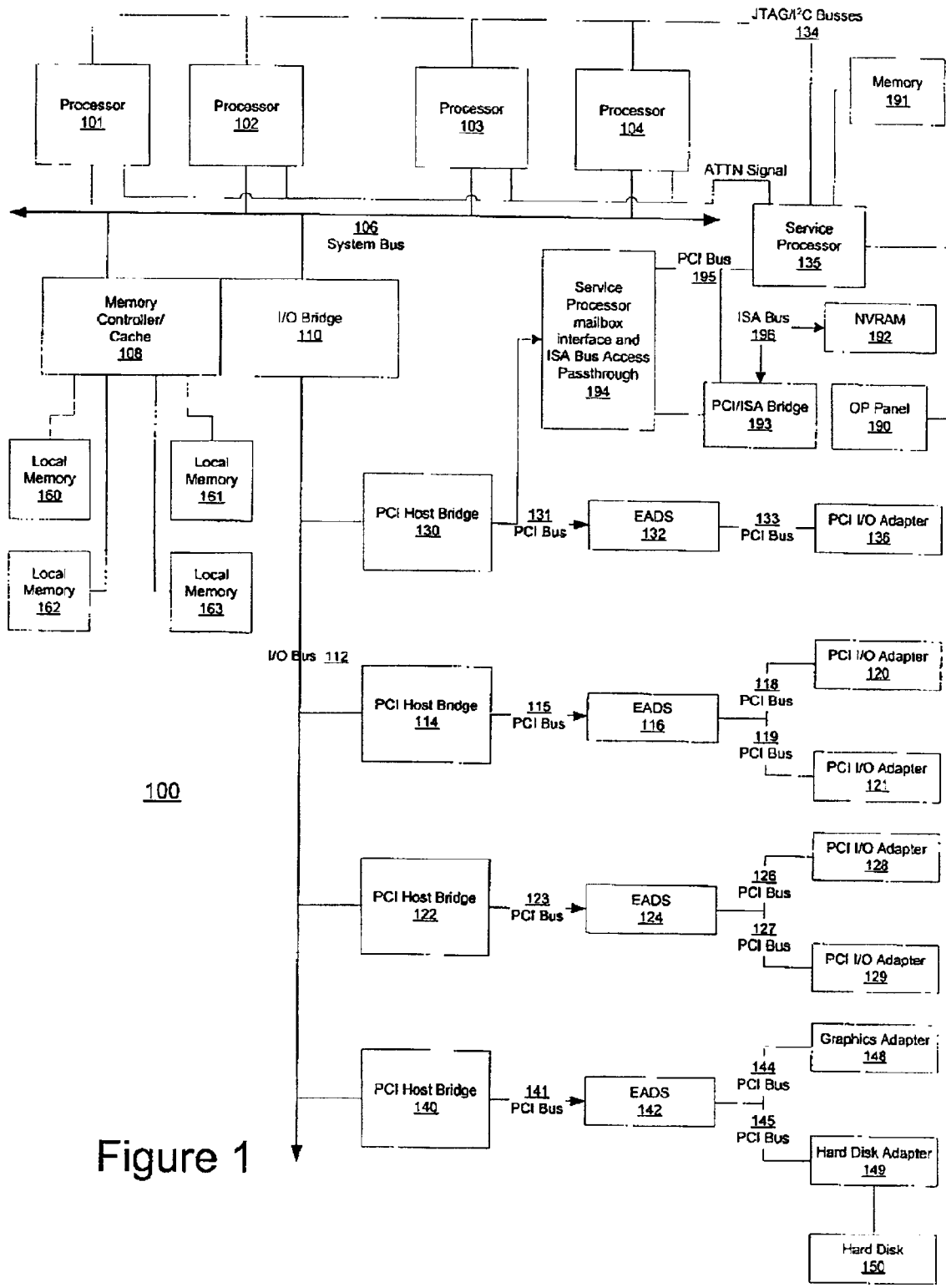
FIG. 1 is an exemplary diagram illustrating a symmetric multiprocessor system according to the present invention.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTS, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
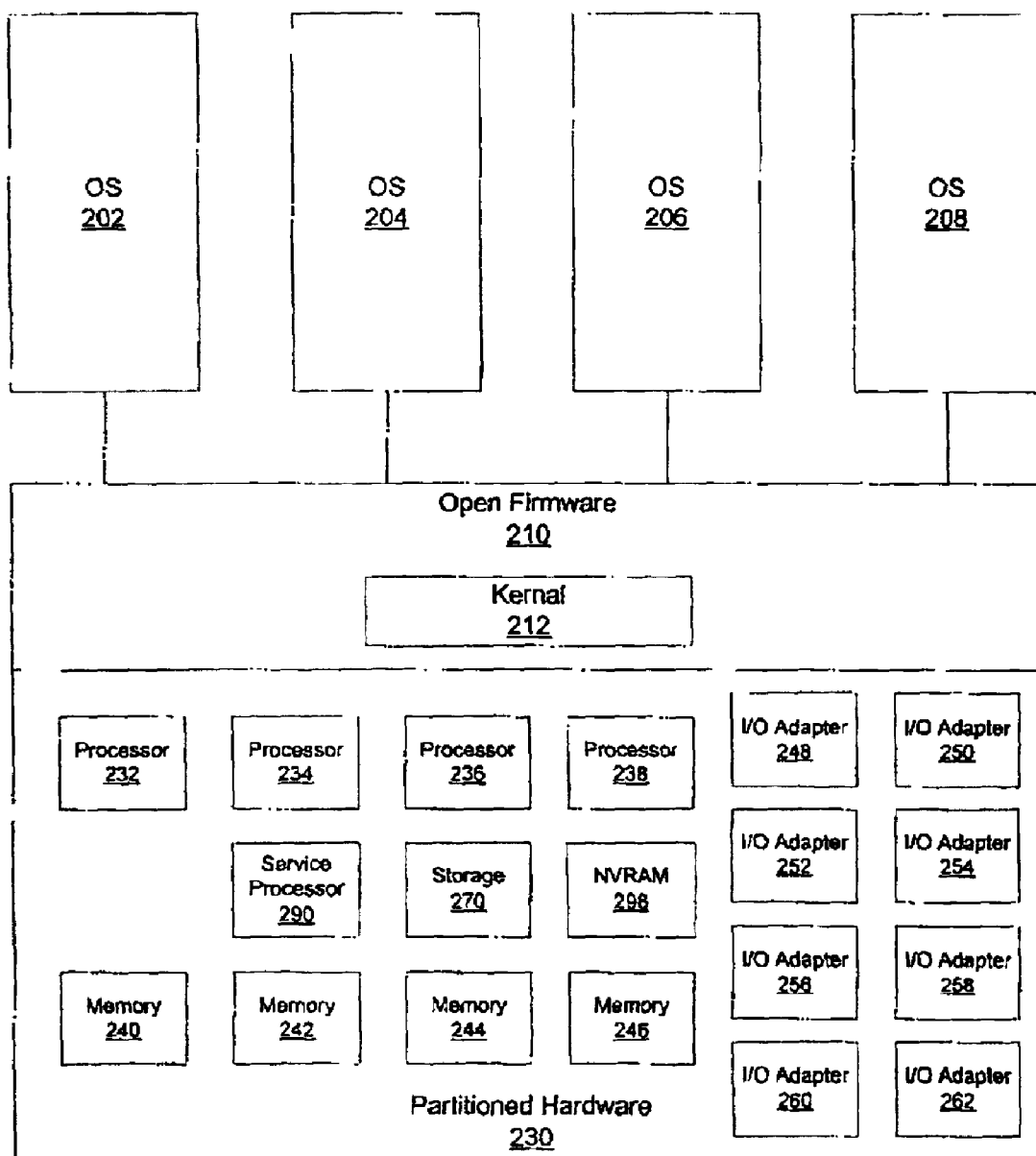
FIG. 2 is an exemplary block diagram illustrating a logically partitioned computing system according to the present invention.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware (OF) 210, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions within logically partitioned platform 200, each of which corresponds to one of operating systems 202–208.

OF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

OF 210 is a firmware implemented virtual machine identical to the underlying hardware. Thus, OF 210 allows the simultaneous execution of independent OF images 202–208 by virtualizing all the hardware resources of logically partitioned platform 200. OF 210 may attach I/O devices through I/O adapters 248–262 to single virtual machines in an exclusive mode for use by one of OS images 202–208.

The OF 210 may be or include a "hypervisor." As mentioned previously, the hypervisor is a firmware resident application, or set of applications, that manages virtual machines and logical partitions. The hypervisor is a facility that provides and manages multiple virtual machines.

With the present invention, a processor in the SMP system may make a hypervisor call for accessing a logical partition of the system resources. During this hypervisor call, a system reset interrupt (SRI) may occur due to, for example, the operator of a hardware system console (HSC) deciding to perform some software installation and/or maintenance on the partition. In order to perform such installation or maintenance, the operator sends a soft reset request to the service processor to generate a SRI to all processors of the partition. This allows the operating system to terminate gracefully all activities before the operating system completely halts itself.

In the prior art systems, the occurrence of the SRI would cause the hypervisor to immediately handle the SRI to thereby reset the partition. If the processor associated with the partition had a lock on a system resource at the time of the reset, the lock would not be released. As a result, the processor would continue to have a lock on the resource indefinitely so that no other processors in the SMP system would be able to access the locked resource. These processors would continue to "spin" on the lock and would become starved due to an inability to complete work assigned to them.

With the present invention, however, if the SRI is a soft reset and occurred during a hypervisor call, the handling of the SRI is delayed until after the hypervisor call is allowed to complete. When the hypervisor call completes, the lock on the system resource is released and the handling of the SRI may commence. In this way, the processors of the partitions are not able to obtain an indefinitely held lock on the system resources. Thus, processor starvation is avoided.

Figure 3:
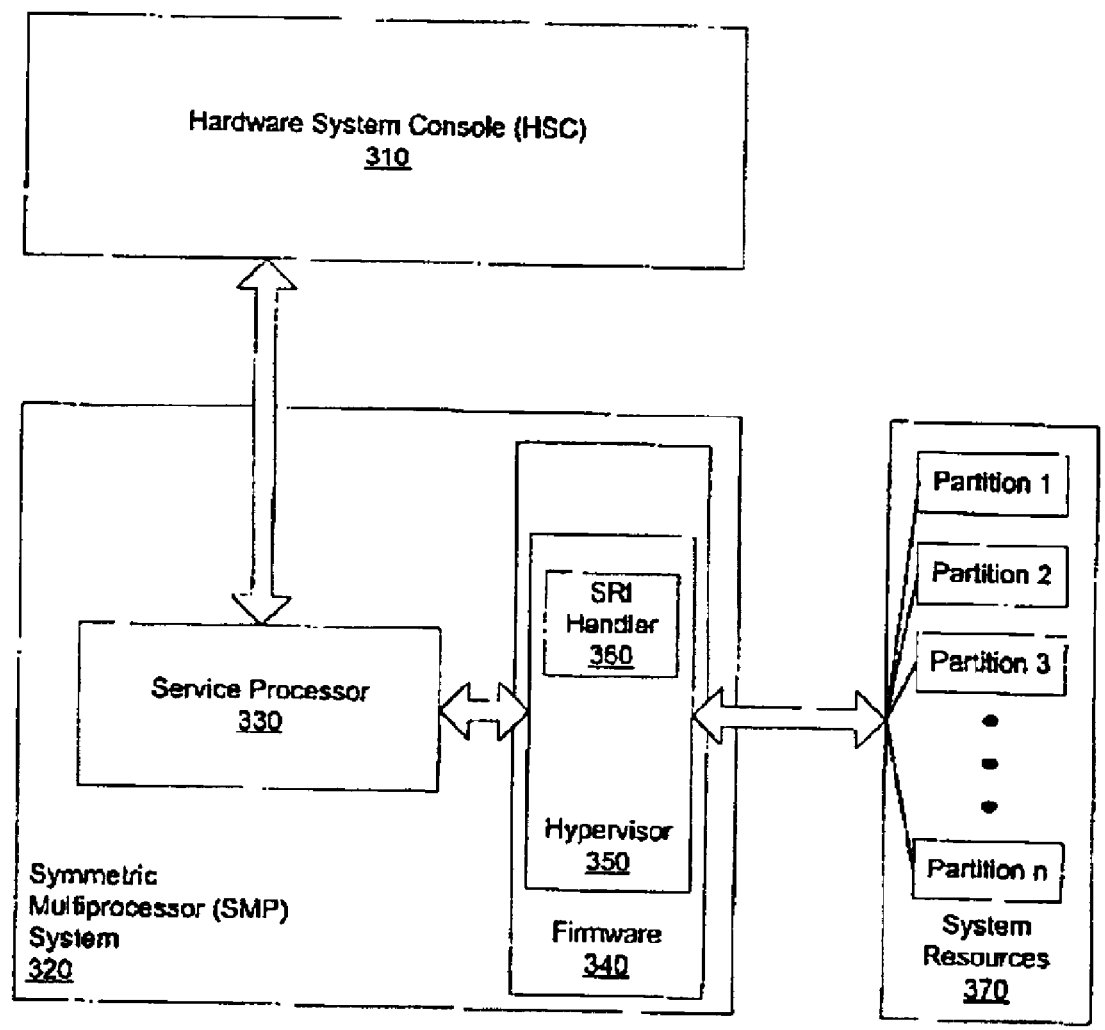
FIG. 3 is an exemplary diagram illustrating an interaction of the primary components of the present invention.

FIG. 3 is an exemplary block diagram for illustrating the interaction of the primary elements of the multiprocessor system according to the present invention. As shown in FIG. 3, the multiprocessor computing environment includes a hardware system console (HSC) 310, a symmetric multiprocessor (SMP) system 320, and system resources 370. Although the HSC 310, SMP system 320 and system resources 370 are shown as separate elements in FIG. 3, the present invention is not limited to such. Rather, any one or more of the elements 310, 320 and 370 may be integrated with one or more of the other elements. Thus, for example, the SMP system 320 may be incorporated with the system resources 370 into a single integrated element without departing from the spirit and scope of the present invention.

The SMP 320 includes firmware 340 in which is provided a hypervisor 350 having a SRI handler 360. The term "hypervisor" as it is used in the present description is used to generally refer to any application, or set of applications, in firmware that is used to manage logical partitions of system resources. The term "hypervisor" is not intended to place any limitation on the particular application or applications, or to reference any particular vendor of these applications. Any application, or set of applications, in firmware that are used to perform logical partition management is intended to be within the spirit and scope of the present invention.

The hypervisor 350 in the firmware 340 of the SMP system 320 is used to perform a number of different logical partition management functions. These functions include allocating resources to logical partitions (hereafter referred to only as "partitions"), installing operating systems in partitions, starting and stopping the operating system in a partition, dumping main storage of a partition, communicating between partitions, and the like. The hypervisor 350 allocates portions of the system resources 370 to various logical partitions 1 to n. A logical partition is comprised of at least one processor and at least one memory area or other system resource.

The HSC 310 provides a graphical user interface (GUI) for the system administrator to configure system resources for the establishment of the logical partitions. The HSC 310 also provides virtual display consoles and virtual op-panels to the logical partitions. The HSC 310 performs its tasks by communicating requests to the service processor 330 which will then carry out the requests by accessing the hardware and updating the software data structures resided in NVRAM storage.

The present invention provides a SRI handler 360 in the hypervisor 350 that is capable of handling SRIs which may occur at any time during the operation of the multiprocessor computing system. The present invention allows a hypervisor call to be completed before an SRI is handled. In this way, the SRI does not cause a processor of the SMP system 320 to indefinitely hold a lock on a system resource 370 and thus, other processors are not starved due to an inability to access the system resource 370.

With the present invention, within each processor, there is a one-bit flag in a hardware specific special purpose register. This flag is referred to as the SRI_delay flag and is used by the system reset interrupt handler 360 of the hypervisor 350 to indicate that a system reset interrupt has occurred. This flag is initialized to 0 by the hardware upon the power-on condition.

When the partition processor receives a system reset interrupt, the SRI handler 360 of the hypervisor 350 is given control. The SRI handler 360 saves the partition processor's registers to a context memory buffer. Next, the SRI handler 360 determines the nature of the reset.

The reset may be either a hard reset or a soft reset. If the reset is a hard reset for terminating the partition, the SRI handler 360 clears the SRI_delay flag and reallocates the processor back to the global processor available pool. In this way, the processor becomes available for reassignment to another partition. Any locks held by the processor which is reallocated to the global processor available pool are released by the hypervisor 350.

If the reset is a soft reset, the SRI handler 360 determines if the SRI occurred while a hypervisor call was in progress. If the SRI occurred during a hypervisor call, the SRI handler sets the SRI_delay flag and changes the "rfid" instruction, i.e. the instruction used by the interrupt handler to return control back to the interrupted code, in the jmp_table of the hypervisor exit code for the processor into a branch instruction to the special routine, named simulated_SRI( ), in the hypervisor which simulates the delay SRI.

The jmp_table is an array where each processor of the system has an instruction which is the last instruction to be executed by the processor at the end of the hypervisor call. Normally, the instruction is the "rfid" instruction. If the SRI occurs during the hypervisor call, this instruction will be replaced by the SRI handler with a branch instruction to the entry point of the special routine in the hypervisor. This special routine, named simulated_SRI( ) and depicted in FIG. 5, discussed hereafter, will be later executed by the hypervisor call to prepare and simulate the delayed SRI so that the SRI can resume the handling of the original interrupt which has previously been delayed.

In addition, the SRI handler 360 restores the registers context and returns to allow the disrupted hypervisor call to complete. When a program is interrupted, the interrupt handler saves all volatile registers into a memory buffer. Register context refers to the contents of all registers of the processor to be saved in order for the interrupted program to be resumed properly.

If the interrupt did not occur during a hypervisor call and it was a soft interrupt, the interrupt must have been the simulated delay SRI from the hypervisor 350, or the interrupt occurred within the partition. If the soft reset interrupt is the simulated delay interrupt or occurred within the partition, the SRI handler 360 checks if the SRI_delay flag is set. If the SRI_delay flag is cleared, then the SRI occurred in a partition environment. If the SRI_delay flag is set, the SRI is a simulated delay SRI of an original SRI which occurred during a hypervisor call. In this case, the SRI handler 360 will clear the SRI_delay flag, and restore the instruction in the jmp_table of the processor back to the original "rfid" instruction. This effectively allows the detection and simulation of delay SRIs in the future.

In any of the above cases, the SRI handler proceeds to send the processor back to the partition's reset entry point for further action. That is, when a SRI occurs, the SRI handler 360 will send the processor back to the partition's operating system reset handler so that the operating system can decide what action to take upon the arrival of the SRI. The operating system may perform its reset function to bring down itself and the partition or to reboot the operating system of the partition, for example.

Figure 4:
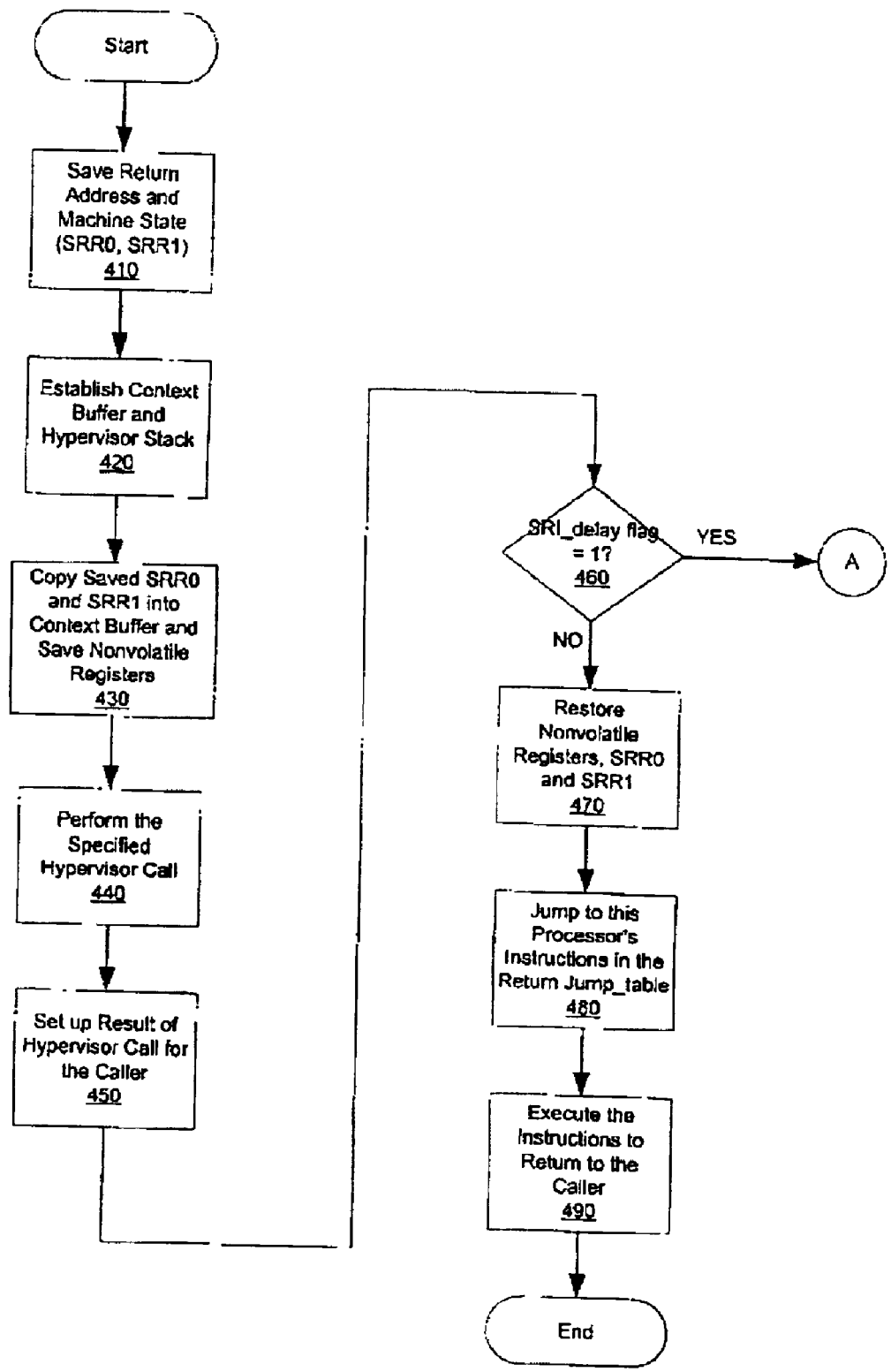
FIGS. 4–7 are flowcharts outlining an exemplary operation of the present invention when handling an SRI.

FIG. 4 is a flowchart outlining an exemplary operation of the present invention. As shown in FIG. 4, the operation starts with the return address and machine state being saved (step 410). A context buffer and hypervisor stack are then established (step 420). The saved return address and machine state are then copied into the context buffer and non-volatile registers are saved (step 430). Thereafter, the specified hypervisor call is performed (step 440).

The result of the hypervisor call is then set up for the caller (step 450) and a determination is made as to whether the SRI_delay flag is set (equal to 1). If so, the operation continues on to step 500 in FIG. 5, which will be described hereafter. If not, the nonvolatile registers, return address and machine state are restored (step 470). The operation then jumps to the processor's instructions in the return jump table for this processor (step 480). The instructions are then executed to thereby return to the caller (step 490).

Figure 5:
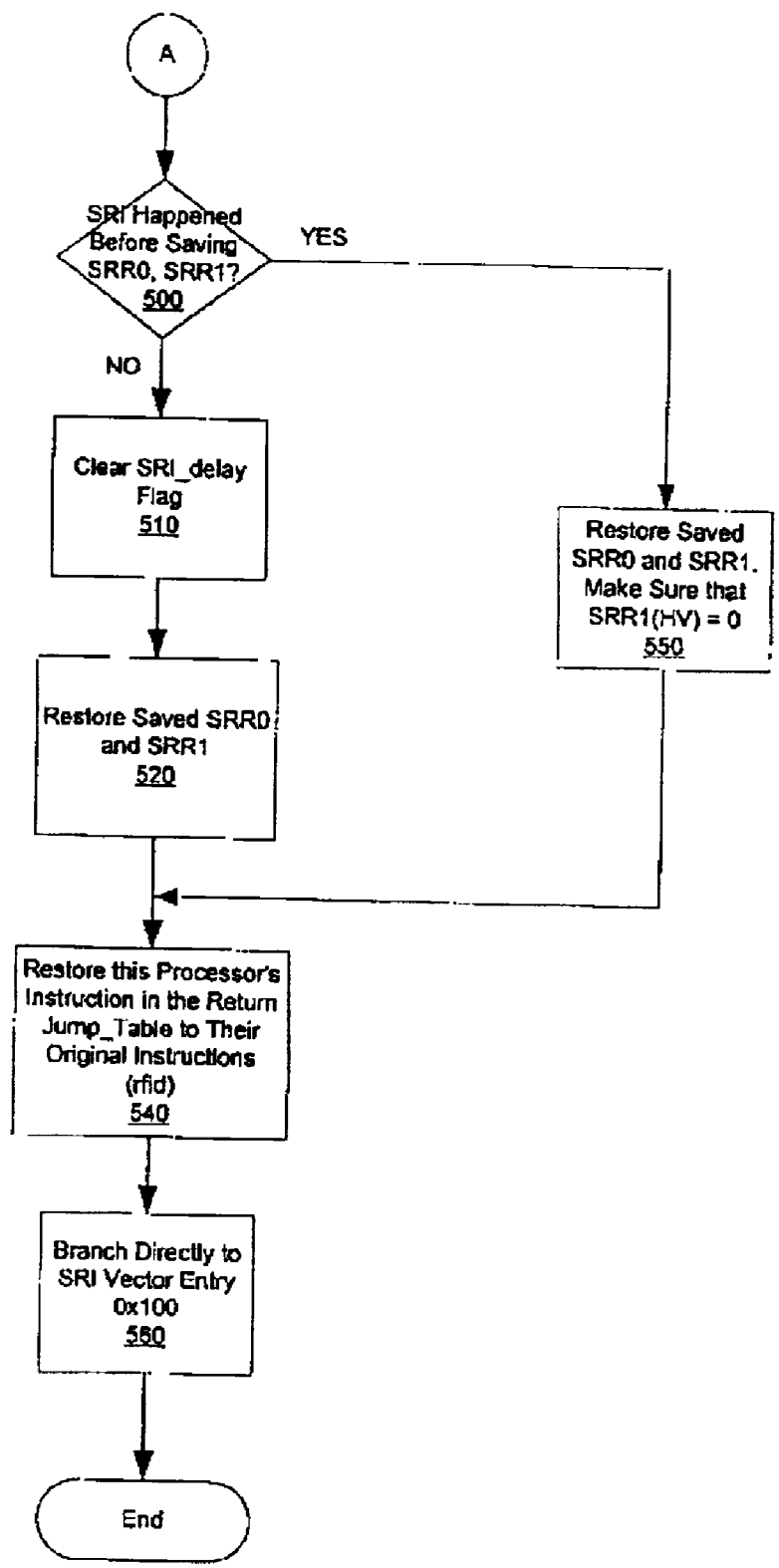

If the SRI_delay flag is set in step 450, the operation continues to step 500 in FIG. 5 where a determination is made as to whether the SRI happened before saving the return address and machine state (step 500). If so, the stored return address and machine state are restored and it is ensured that SRR1(HV) equals zero (step 550). That is, if the SRI happened before the caller's SRR0 (returned address) and SRR1 (returned machine-state) are saved, these registers are then modified by the SRI hardware mechanism to contain the returned address and machine-state of the interrupted hypervisor call. In this case, SRR1(HV)=1, i.e. the machine state is in hypervisor mode. When the processor is in hypervisor mode, it has unlimited authority to access any system resources. Therefore, before simulating the delay SRI, the SSR1(HV) is cleared to 0. When the SRI handler resumes the servicing of the SRI and sends the processor back to the partition, it will not inadvertently grant hypervisor mode to the processor in the partition.

If the SRI did not happen before saving the return address and machine state, the SRI_delay flag is cleared (step 510) and the saved return address and machine state are restored (step 520). Thereafter, or after step 550, the processor's instruction in the return jump table is restored to its original instruction (step 540). Then the operation branches directly to the SRI vector entry 0–100 (step 560).

Figure 6:
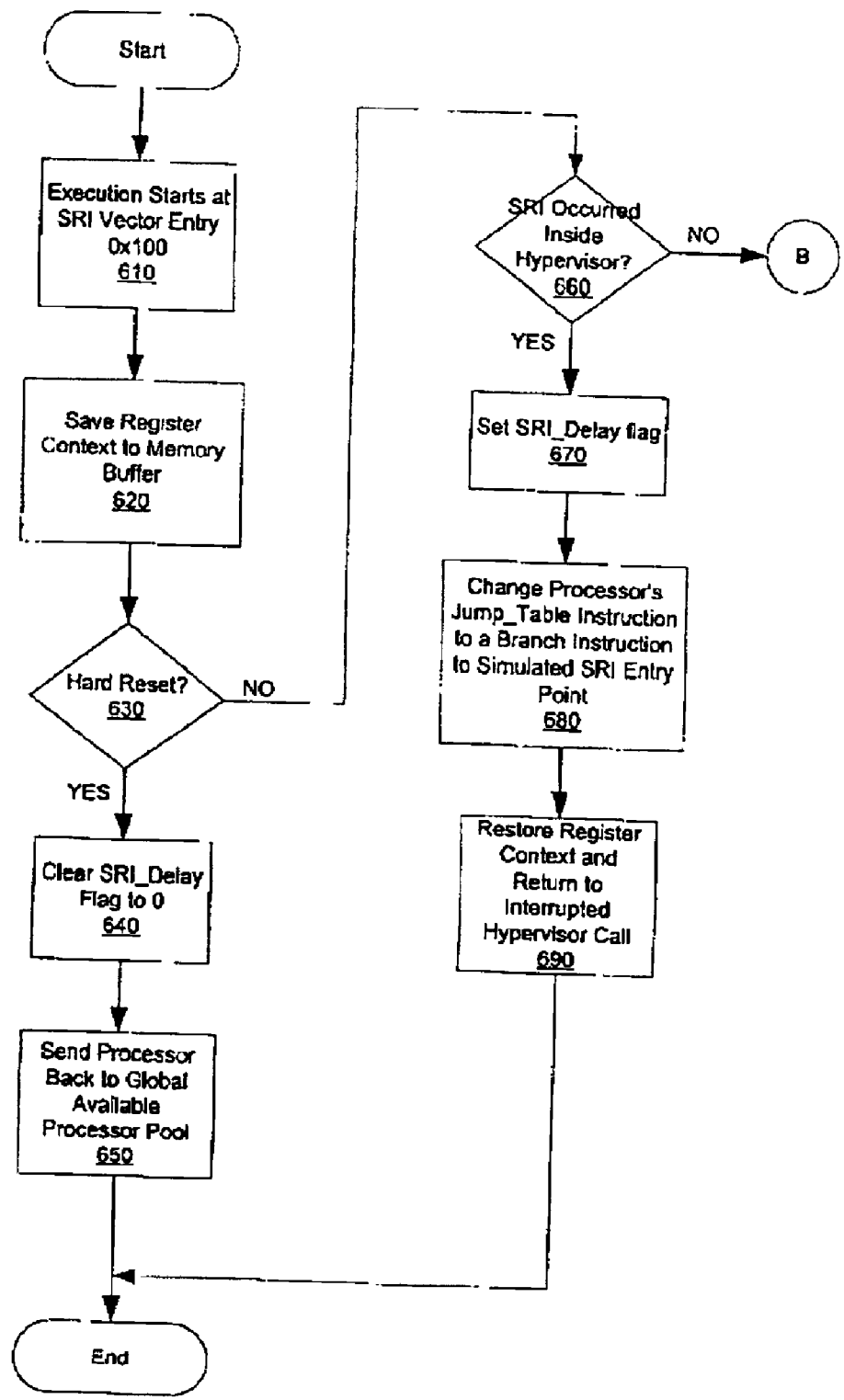

When the operation branches to the SRI vector entry 0×100 in step 560, the operation shown in FIG. 6 is performed. As shown in FIG. 6, this operation starts with execution at SRI vector entry 0×100 (step 610). The register context is saved to a memory buffer (step 620). A determination is then made as to whether the SRI was a hard reset (step 630). If so, the SRI_delay flag is cleared to 0 (step 640) and the processor is sent back to the global available processor pool (step 650).

If the SRI was not a hard reset (step 630), the operation determines whether the SRI occurred inside the hypervisor, i.e. during a hypervisor call (step 660). If so, the SRI_delay flag is set (step 670). The processor's jump table instruction is then changed to a branch instruction to a simulated SRI entry point (step 680). The register context is then restored and the operation returns to the interrupted hypervisor call (step 690) so that the hypervisor call may be completed.

Figure 7:
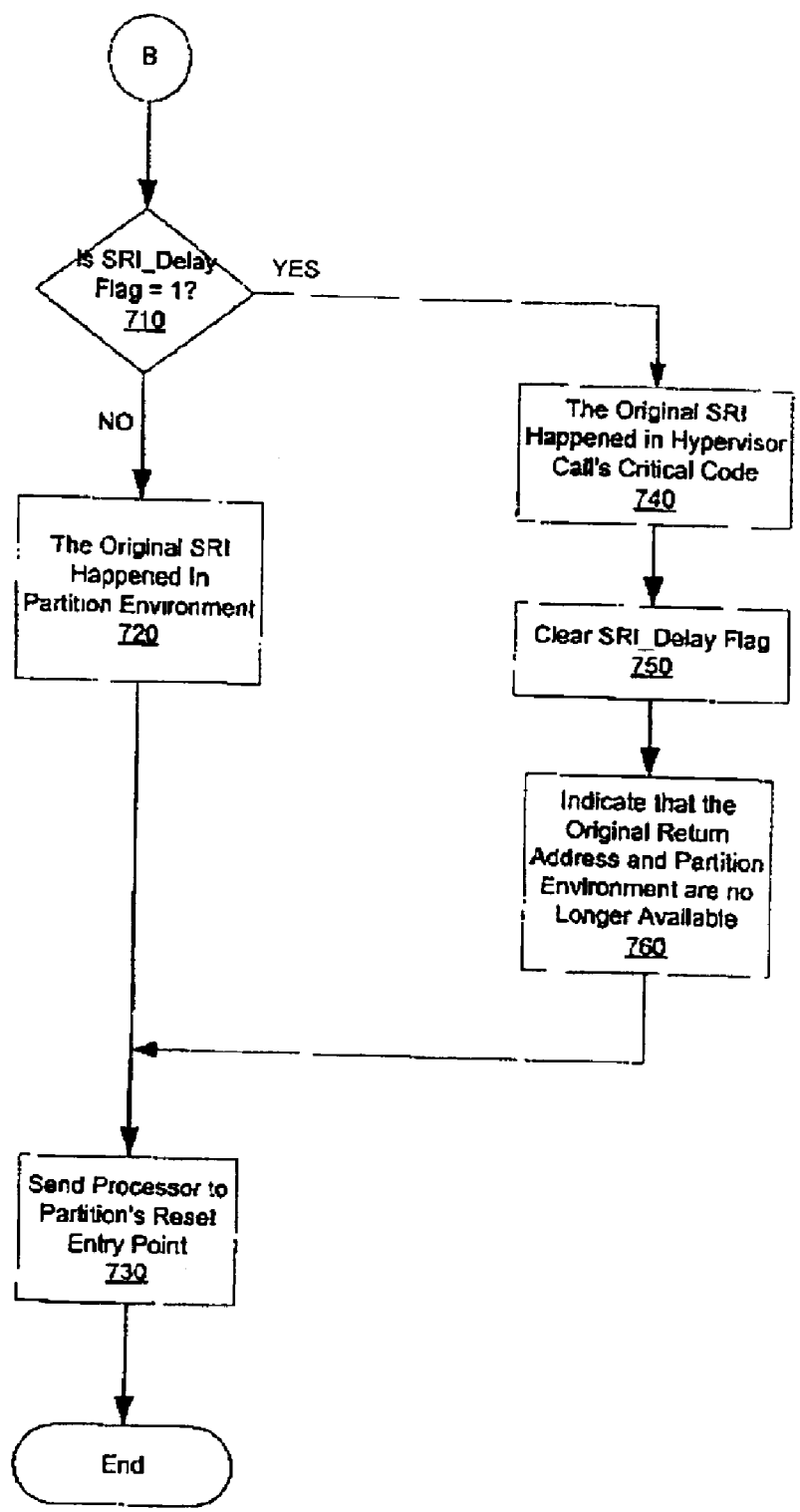

If the SRI did not occur inside the hypervisor (step 660), the operation goes to step 710 in FIG. 7 where a determination is made as to whether the SRI_delay flag is set (step 710). If not, the original SRI happened in the partition environment (step 720) and the processor is directed to the partition's reset entry point (step 730). If the SRI_delay flag is set (step 710), the original SRI happened in the hypervisor call's critical code (step 740) and the SRI_delay flag is cleared (step 750). The original return address and partition environment are then indicated as no longer being available (step 760) and the operation continues on to step 730.

Thus, the present invention provides a mechanism by which starvation of processors due to a SRI occurring during a hypervisor call is avoided. The present invention allows a hypervisor call to be completed before handling a soft system reset interrupt. In this way, the reliability of the overall multiprocessor system is increased.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing system reset interrupts, wherein an associated processor has a return control instruction, said method comprising:

receiving a system reset interrupt for a logical partition;

determining if an operation on the logical partition is being performed at the time the system reset interrupt is received;

deferring handling of the system reset interrupt until after the operation on the logical partition is completed; and changing the return control instruction to a branch instruction that branches to a routine for simulating the system reset interrupt, when the operation is a hypervisor call.

2. The method of claim 1, further comprising storing contents of registers of a processor associated with the logical partition in a context memory buffer in response to receiving the system reset interrupt.

3. The method of claim 1, further comprising determining if the system reset interrupt is a hard reset.

4. The method of claim 3, wherein if the system reset interrupt is a hard reset, a system reset interrupt delay flag is cleared and the processor is reallocated to a global processor available pool.

5. The method of claim 1, wherein the operation is a hypervisor call, and wherein deferring handling of the system reset interrupt until after the operation on the logical partition is completed includes:

setting a system reset interrupt flag.

6. The method of claim 5, further comprising:

restoring register context for the processor after setting the system reset interrupt flag and changing the return control instruction; and returning control to the operation.

7. The method of claim 1, wherein deferring handling of the system reset interrupt until after the operation on the logical partition is completed includes:
   checking a system reset interrupt flag to determine if it is set; and
   resetting a return control instruction to an original value in a jump table for a processor associated with the logical partition, if the system reset interrupt flag is set.

8. An apparatus for managing system reset interrupts, comprising:
   means for receiving a system reset interrupt for a logical partition;
   means for determining if an operation on the logical partition is being performed at the time the system reset interrupt is received;
   means for deferring handling of the system reset interrupt until after the operation on the logical partition is completed; and
   means for changing a return control instruction to a branch instruction that branches to a routine for simulating the system reset interrupt, when the operation is a hypervisor call.

9. The apparatus of claim 8, further comprising means for storing contents of registers of a processor associated with the logical partition in a context memory buffer in response to receiving the system reset interrupt.

10. The apparatus of claim 8, further comprising determining if the system reset interrupt is a hard reset.

11. The apparatus of claim 10, wherein if the system reset interrupt is a hard reset, a system reset interrupt delay flag is cleared and the processor is reallocated to a global processor available pool.

12. The apparatus of claim 8, wherein the operation is a hypervisor call, and wherein the means for deferring handling of the system reset interrupt until after the operation on the logical partition is completed includes:
   means for setting a system reset interrupt flag.

13. The apparatus of claim 12, further comprising:
   means for restoring register context for the processor after setting the system reset interrupt flag and changing the return control instruction; and
   means for returning control to the operation.

14. The apparatus of claim 8, wherein the means for deferring handling of the system reset interrupt until after the operation on the logical partition is completed includes:
   means for checking a system reset interrupt flag to determine if it is set; and
   means for resetting a return control instruction to an original value in a jump table for a processor associated with the logical partition, if the system reset interrupt flag is set.

15. A computer program product in a computer readable medium for managing system reset interrupts, comprising:
   first instructions for receiving a system reset interrupt for a logical partition;
   second instructions for determining if an operation on the logical partition is being performed at the time the system reset interrupt is received;
   third instructions for deferring handling of the system reset interrupt until after the operation on the logical partition is completed; and
   fourth instructions for changing a return control to a branch instruction that branches to a routine for simulating the system reset interrupt when the operation is a hypervisor.

16. The computer program product of claim 15, further comprising fourth instructions for storing contents of registers of a processor associated with the logical partition in a context memory buffer in response to receiving the system reset interrupt.

17. The computer program product of claim 15, further comprising fifth instructions for determining if the system reset interrupt is a hard reset.

18. The computer program product of claim 17, wherein if the system reset interrupt is a hard reset, a system reset interrupt delay flag is cleared and the processor is reallocated to a global processor available pool.

19. The computer program product of claim 15, wherein the operation is a hypervisor call, and wherein the third instructions for deferring handling of the system reset interrupt until after the operation on the logical partition is completed include:
   instructions for setting a system reset interrupt flag.

20. The computer program product of claim 19, further comprising:
   instructions for restoring register context for the processor after setting the system react interrupt flag and changing tic return control instruction; and
   instructions for returning control to the operation.

21. The computer program product of claim 15, wherein the third instructions for deferring handling of the system reset interrupt until after the operation on the logical partition is completed include:
   instructions for checking a system reset interrupt flag to determine if it is set; and
   instructions for resetting a return control instruction to an original value in a jump table for a processor associated with the logical partition, if the system reset interrupt flag is set.

* * * * *